(12) United States Patent
Fuse et al.

(10) Patent No.: US 6,885,682 B2
(45) Date of Patent: Apr. 26, 2005

(54) FIBER-LASER DEVICE AND IMAGE DISPLAY USING THE SAME

(75) Inventors: Kazuyoshi Fuse, Yokohama (JP); Masanobu Kimura, Kamakura (JP); Naoki Akamatsu, Yokohama (JP); Toru Sugiyama, Yokohama (JP); Kou Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/109,004

(22) Filed: Mar. 29, 2002

(65) Prior Publication Data

US 2003/0086445 A1 May 8, 2003

(30) Foreign Application Priority Data

Nov. 6, 2001 (JP) ........................................ 2001-340799

(51) Int. Cl.$^7$ ................................................. H01S 3/30
(52) U.S. Cl. .......................................... 372/6; 372/108
(58) Field of Search ................................ 372/6, 71, 75, 372/39, 27, 18, 70, 5, 32, 97, 22, 3, 102, 108, 38.04; 359/341.32; 353/31; 385/142

(56) References Cited

U.S. PATENT DOCUMENTS

| 4,923,273 A | * | 5/1990 | Taylor ......................... 385/48 |
| 5,237,576 A | | 8/1993 | DiGiovanni et al. ........... 372/6 |

(Continued)

FOREIGN PATENT DOCUMENTS

| CN | 1024612 | 5/1994 |
| CN | 1141096 | 1/1997 |
| CN | 1212060 | 3/1999 |
| EP | 0 426 222 B1 | 5/1991 |
| JP | 63-74024 | 4/1988 |
| JP | 63-226985 | 9/1988 |
| JP | 2-186303 | 7/1990 |
| JP | 6-21536 | 1/1994 |
| JP | 7-226551 | 8/1995 |
| JP | 9-508476 | 8/1997 |
| JP | 11-237509 | 8/1999 |
| JP | 2000-162548 | 6/2000 |
| JP | 2000-339735 | 12/2000 |
| JP | 2001-28468 | 1/2001 |
| JP | 2001-264662 | 9/2001 |
| WO | WO 95/20811 | 8/1995 |

OTHER PUBLICATIONS

The Patent Office of the People's Republic of China, "Notification of First Office Action and Text of the Notification of First Office Action," including translation, (Apr. 9, 2004).

J.Y. Allain, M. Monerie, H. Poignant, Electronics Letters, vol. 26, No. 3, 1990, pp. 166–168.

E.W.J.L. Oomen and E. J. Lous, "A Material and Device Study for Obtaining a Blue Upconversion Fiber Laser", Philips J. Res. 45, 1992, pp. 157–198.

Japanese Office Action, dated Jun. 15, 2004 for Patent Application No. 2001–340799.

Sandrock et al., "High–Power Continuous–Wave Upconversion Fiber Laser at Room Temperature," Optics Letters, vol. 22, Jun. 1, 1997, pp. 808–810.

(Continued)

*Primary Examiner*—Minsun Oh Harvey
*Assistant Examiner*—Tuan N. Nguyen
(74) *Attorney, Agent, or Firm*—Pillsbury Winthrop LLP

(57) ABSTRACT

A core of an excitation light source is spliced with a first optical fiber to which no laser activation material is added, so that the light output from the first optical fiber is injected to a second optical fiber to a core of which the laser activation material is added.

3 Claims, 3 Drawing Sheets

U.S. PATENT DOCUMENTS

| | | | |
|---|---|---|---|
| 5,572,357 A | * 11/1996 | Nakazato et al. | 359/341.33 |
| 5,761,234 A | * 6/1998 | Craig et al. | 372/75 |
| 5,774,484 A | * 6/1998 | Wyatt et al. | 372/6 |
| 5,894,489 A | * 4/1999 | Halldorsson et al. | 372/23 |
| 5,905,745 A | * 5/1999 | Grubb et al. | 372/6 |
| 5,937,134 A | * 8/1999 | DiGiovanni | 385/142 |
| 5,991,068 A | 11/1999 | Massicott et al. | |
| 6,081,366 A | * 6/2000 | Kidorf et al. | 359/341.32 |
| 6,109,751 A | 8/2000 | Hashizume et al. | |
| 6,167,075 A | * 12/2000 | Craig et al. | 372/75 |
| 6,224,216 B1 | * 5/2001 | Parker et al. | 353/31 |
| 6,243,515 B1 | 6/2001 | Heflinger et al. | 385/37 |
| 6,317,443 B1 | * 11/2001 | Craig et al. | 372/38.04 |
| 6,320,885 B1 | * 11/2001 | Kawai et al. | 372/6 |
| 6,356,574 B1 | * 3/2002 | Craig et al. | 372/75 |
| 6,363,088 B1 | * 3/2002 | Alphonse et al. | 372/6 |
| 6,373,863 B1 | * 4/2002 | Ohishi et al. | 372/6 |
| 6,400,736 B1 | * 6/2002 | Aherne et al. | 372/6 |
| 6,400,746 B1 | * 6/2002 | Yang | 372/102 |
| 6,487,338 B1 | * 11/2002 | Asawa et al. | 385/29 |
| 6,613,042 B1 | * 9/2003 | Tankovich et al. | 606/10 |
| 6,636,274 B1 | * 10/2003 | Mazda et al. | 348/745 |
| 2001/0022566 A1 | 9/2001 | Okazaki | 345/84 |

* cited by examiner

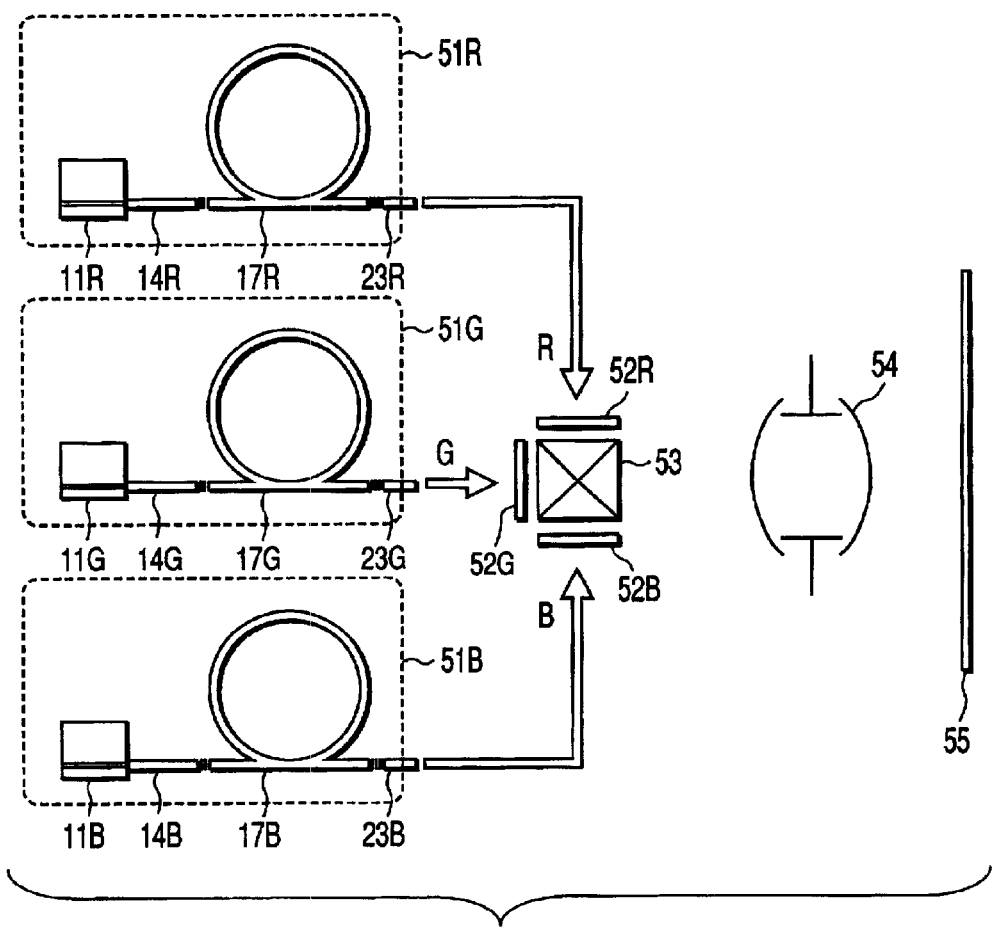
F I G. 5
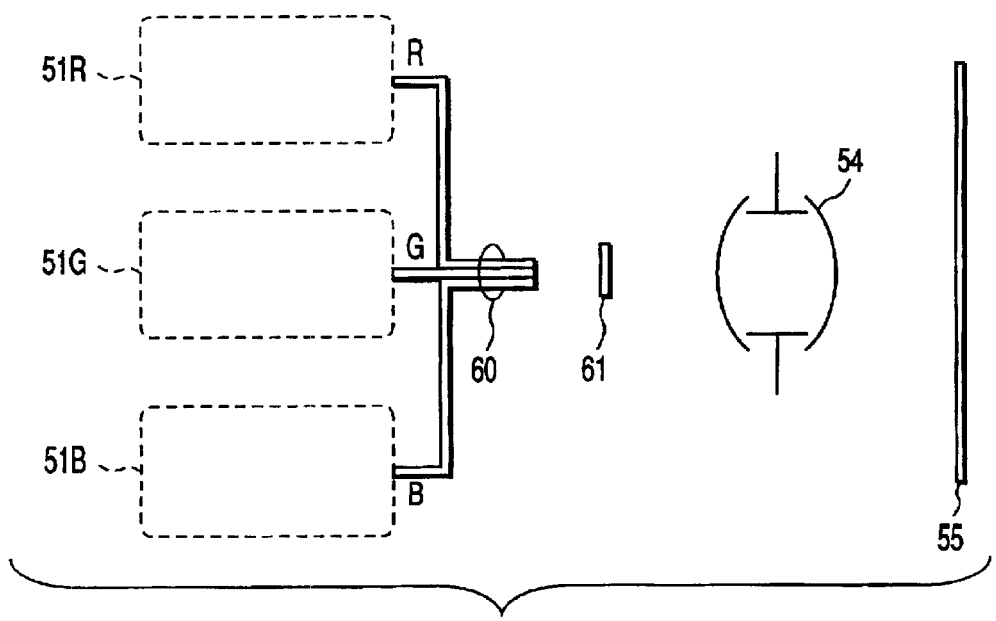
F I G. 6

FIBER-LASER DEVICE AND IMAGE DISPLAY USING THE SAME

CROSS-REFERENCE TO RELATED APPLICATIONS

This application is based upon and claims the benefit of priority from the prior Japanese Patent Application No. 2001-340799, filed Nov. 6, 2001, the entire contents of which are incorporated herein by reference.

BACKGROUND OF THE INVENTION

1. Field of the Invention

The present invention relates to a fiber-laser device using an optical fiber to a core of which a laser activation material is added, and an image display using this device.

2. Description of the Related Art

An up-conversion method is available for using a long-wavelength laser light to thereby generate a short-wavelength laser light. The up-conversion method is based on a principle comprising a step (1) in which rare earth ions added to a core of an optical fiber absorb an excited light to enter an excited state, a step (2) in which subsequently the thus excited ions additionally absorb the excited light to be further excited; and a step (3) in which the thus further excited ions transit into a lower energy level state to generate a light having a wavelength smaller than that of the absorbed excited light. A technology regarding the up-conversion is disclosed, for example, in a literature by J. Y. Allain, et al. "Blue Upconversion Fluorozirconate FiberLaser" Electron Lett. 26, 1990, 166". There is also another literature available by E. W. J. Oomen et al. "A Material and Device Study for Obtaining a Blue Upconversion FiberLaser" Philips J. Res. 46, 157–198, 1992.

Furthermore, Jpn. Pat. Appln. KOKAI Publication No. 7-226551 discloses a method for using Tm ions or Tb ions as rare earth ions to obtain a light having a short wavelength of 455 nm from a laser light having a wavelength of 640–650 nm or 670–810 nm.

According to this method, on both ends of an up-conversion fiber to the core of which the Tm ions or Tb ions are added, films are formed which to have a predetermined reflection coefficient for a 455 nm wavelength. Then, a light having the 455 nm wavelength generated in the fiber resonates between these two films, thus being emitted as a short-wavelength laser light.

The up-conversion fiber is generally elongated (1 to 5 m), depending on an excited-light power, a concentration of added ions, and a fiber core diameter though. As disclosed in the above patent publication, therefore, to form reflection films on both ends of an up-conversion fiber, the fiber must be entirely dipped into, for example, an evaporation tab, which is a problem. This job is actually accompanied by some difficulty in manufacturing. Moreover, an excitation light source becomes high temperature in use, so that an up-conversion fiber, if near the excitation light source, gets heat conducted therefrom. This gives a possibility that a shift of an optical axis owing to fluctuations in temperature may occur at a spliced portion between the excitation light source and the up-conversion fiber.

Thus, a prior art up-conversion fiber has some difficulty in forming reflection films on both ends thereof. Moreover, the up-conversion fiber, if near the excitation light source, may encounter the shift of the optical axis at its splicing owing to the fluctuations in temperature.

BRIEF SUMMARY OF THE INVENTION

It is an aspect of the present invention to provide such a fiber-laser device and image display using the same that has a high reliability and is easy to manufacture.

To achieve the above-mentioned object, an embodiment of the present invention comprises an excitation light source, a first optical fiber which receives a light emitted from the excitation light source and to the core of which no laser activation material is added, and a second optical fiber to one end of which the light output from the first optical fiber is injected and from the other end of which the output light is emitted, the laser activation material being added to the core which emits the light output from the other end.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a schematic configuration diagram for showing a display using the fiber-laser device according to an embodiment of the present invention;

FIG. 6 is a schematic configuration diagram for showing the display using the fiber-laser device according to another embodiment of the present invention.

DETAILED DESCRIPTION OF THE INVENTION

The following will describe embodiments of the present invention with reference to the drawings.

Figure 1:
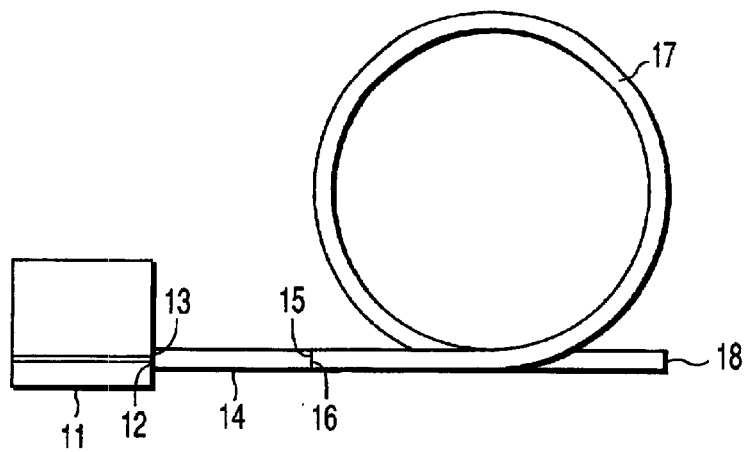
FIG. 1 is a schematic configuration diagram for showing a fiber-laser device according to a first embodiment of the present invention.
Figure 2:
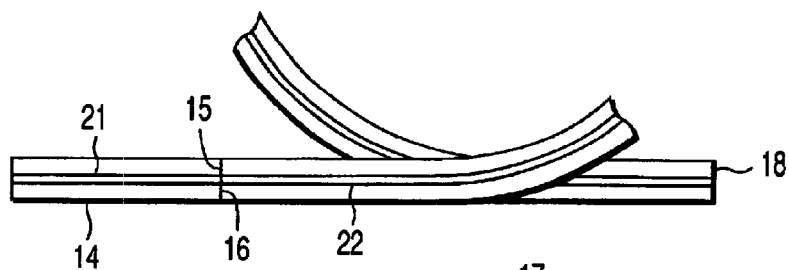
FIG. 2 is an expanded configuration diagram for showing only an important part of FIG. 1.

FIG. 1 is a schematic configuration diagram for showing a fiber-laser device according to a first embodiment of the present invention and FIG. 2, an expanded configuration diagram for showing only an important part of FIG. 1.

In FIG. 1, a reference numeral 11 indicates a semiconductor laser serving as one example of an excitation light source. Although a semiconductor laser is exemplified as the excitation light source 11, any other type may be employed as far as it can excite a laser activation material added to a core of an optical fiber spliced at the subsequent stage. An activation layer 12 of the semiconductor laser at which an excited light is emitted is spliced to an injection end 13 of a first optical fiber 14 to a core 21 of which no laser activation material is added. The first optical fiber 14 guides the excited light to its emission end 15. The emission end 15 is spliced to an injection end 16 of a second optical fiber 17 to a core 22 of which a laser activation material is added. Thus, at both ends of the second optical fiber 17, Fresnel reflection occurs, thus making up an optical resonator. In this configuration, it is possible to obtain a laser light having a desired wavelength from an emission end 18 by appropriately setting a wavelength of the excited light and its output energy level and a type and amount of a laser activation material added to the core 22 of the second optical fiber 17.

The semiconductor laser 11 and the first optical fiber 14 can be spliced with each other optically by a few methods. They can be inter-spliced directly as shown in FIG. 1 if there is no large difference between the size of the active layer and the diameter of the optical fiber's core. Actually, there is typically a dimensional difference between them (specifically, between the active layer size and the optical fiber's core diameter), in which case they may be inter-spliced in a free space by using an optical element such as a lens. Moreover, an optical wave-guide path may be used to thereby inter-splice the semiconductor laser 11 and the optical fiber 14. In this case, such a configuration is employed that the injection end of the optical wave-guide path may match the size of the active layer of the semiconductor laser 14 and the emission end thereof may match the size of the core of the next-stage optical fiber 14.

Particularly when a high-power semiconductor laser is used, the active layer is to have a larger width. For this reason, to inter-splice the optical fiber 14 and the semiconductor laser 11, an optical wave-guide path should preferably be used in splicing configuration for easier modularization as a splicing component. This is because of easy alignment as compared to inter-splicing by use of such an optical element as a lens.

When, typically, an excited light is injected to an optical fiber to the core of which a laser activation material is added, most of the power of the excited light is radiated as thermal energy to the outside except a power component used to excited the laser activation material. If, for example, a semiconductor laser a power 5 W is used to obtain a fiber-laser power of 1 W, the most of the energy, i.e., an maximum of 4 W, is radiated as heat from the optical fiber.

With an increasing power of the semiconductor laser, the amount of the heat radiated therefrom increases, accompanied by an increase in the amount of heat radiated from the optical fiber, so that a spliced portion between them is liable to be encountered by a shift of an optical axis owing to the temperature fluctuations as described above.

In this embodiment, the first optical fiber 14 is interposed between the semiconductor laser 11 and the second optical fiber 17 to which a laser activation material is added. In this configuration, the semiconductor laser 11 and the second optical fiber 17 are isolated from each other thermally. As a result, the shift of the optical axis owing to temperature fluctuations due to heating can be mitigated.

Furthermore, the first optical fiber 14 and the second optical fiber are inter-spliced by means of butt-jointing of inter-contacting them directly. For example, a prevalent PC splicing method by use of a Physical Contact (PC) connector is established technologically including reliability. By using the PC splicing method to inter-splice an endothermic optical fiber and a different optical fiber, the degree of the shift of the optical axis owing to temperature fluctuations can be reduced as compared to the case of directly inter-splicing the endothermic optical fiber and a different optical element.

By using the PC splicing method to inter-splice the first optical fiber 14 and the second optical fiber 17, therefore, the shift of the optical axis at the inter-splicing owing to temperature fluctuations can be reduced as compared to the case of splicing the second optical fiber 17 directly to the semiconductor laser 11 or an optical wave-guide path.

Figure 3:
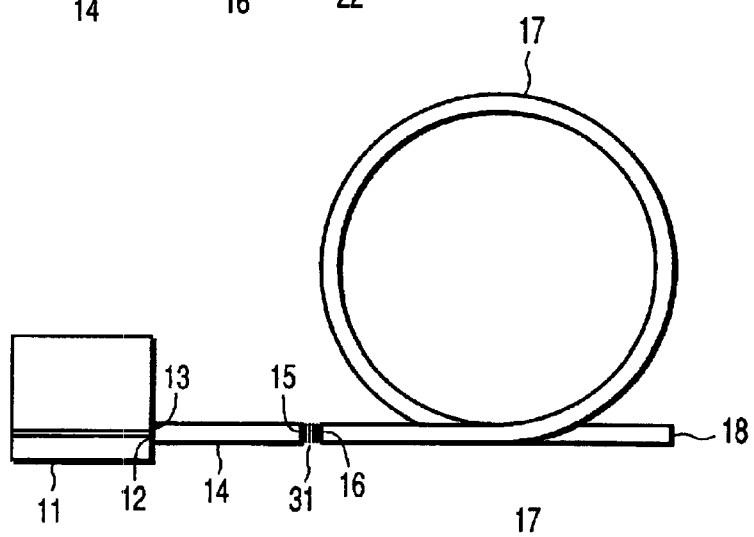
FIG. 3 is a schematic configuration diagram for showing the fiber-laser device according to a second embodiment of the present invention.

FIG. 3 is a schematic configuration diagram for showing the fiber-laser device according to a second embodiment of the present invention. The embodiment of FIG. 1 has been described with an example of making up an optical resonator by utilizing Fresnel reflection at both ends of the second optical fiber 17. That is, such an optical resonator has been exemplified that utilizes the reflection of light at both end faces of the second optical fiber 17. As given in the embodiment of FIG. 3, however, the reflection element may be formed outside the second optical fiber in order to make up the resonator effectively. In the description, the same elements as those in FIG. 1 are indicated by the same reference numerals.

That is, on the end face of the emission end 15 of the first optical fiber 14, a mirror 31 with a predetermined reflection coefficient is formed as the reflection element by, for example, evaporation of a dielectric thin film. In this case, an optical resonator is made up by the mirror 31 and the emission end 18 of the second optical fiber 17. The dielectric thin film may also be formed by sputtering.

Figure 4:
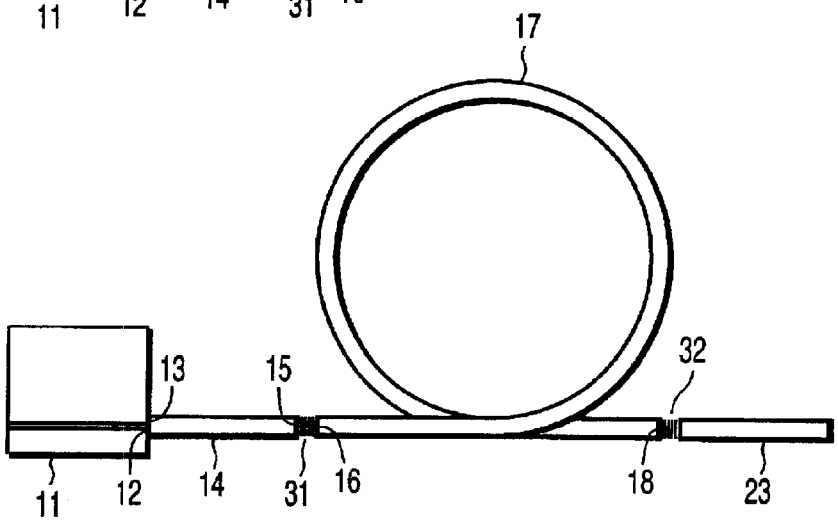
FIG. 4 is a schematic configuration diagram for showing the fiber-laser device according to a third embodiment of the present invention.

FIG. 4 is a schematic configuration diagram for showing the fiber-laser device according to a third embodiment of the present invention. This embodiment differs from the third embodiment in that a mirror with a predetermined reflection coefficient is further disposed outside the emission end 18 so that the mirrors 31 and 32 may make up an optical resonator. In this configuration, the mirror 32 is formed as a third optical fiber (in which the core is made of a non-active material).

In principle, the mirrors 31 and 32 may be formed at the respective two ends of the second optical fiber 17 to which a laser activation material is added. To form the mirrors by evaporating a dielectric thin film, however, it is necessary to dip the resultantly elongated second optical fiber 17 entirely into an evaporation tab. In this case, the manufacturing process is complicated because the second optical fiber 17 long.

To guard against this, a mirror should be formed on the face of the emission end of the short, first optical fiber 14 and the face of the injection end of the third optical fiber, thus facilitating the manufacturing process.

Suppose now that the second optical fiber 17 is to be operated as an up-conversion fiber as a light source in an image display. In this configuration, by adding predetermined rare earth as the laser activation material to the core 22 and setting the wavelength of the excited light appropriately, it is possible to obtain a red (R), green (G), or blue (B) light. For example, by adding $Pr^{+3}$ (praseodymium ions) to the second optical fiber 17 to then excite it with an infrared light having a wavelength of 780 to 900 nm, the excited ions transit from the current energy level down to a lower level as giving rise to a light having a wavelength of nearly 635 nm (R), nearly 520 nm (G), nearly 490 nm (B), etc. By matching, in setting, the reflection coefficient of the mirror of the first up-conversion fiber resonator with a wavelength of nearly 635 nm (R), therefore, a laser light corresponding to read (R) can be obtained.

Furthermore, by matching, in setting, the reflection coefficient of the mirror of the second up-conversion fiber resonator with a wavelength of nearly 520 nm (G), a laser light corresponding to green (G) can be obtained. Further also, by matching that of the third up-conversion fiber resonator with a wavelength of nearly 490 nm (G), a laser light corresponding to blue (B) can be obtained.

Thus obtained laser light corresponding to R, G, or B color can be utilized as a light source in a display because it can act as almost a point light source and also has good color rendition.

FIG. 5 is a schematic configuration diagram for showing a display using the fiber-laser device according to an embodiment of the present invention. Reference numerals 51R, 51G, and 51B indicate fiber-laser devices for emitting R, G, and B color laser lights respectively. In this embodiment, these fiber-laser devices 51R, 51G, and 51B employs such a configuration as shown in FIG. 4.

The fiber-laser device 51R comprises an excitation light source 11R, a first optical fiber 14R, a second optical fiber 17R, and mirrors 31R and 32R for realizing up-conversion. The fiber-laser device 51G comprises an excitation light source 11G, a first optical fiber 14G, a second optical fiber 17G, and mirrors 31G and 32G for realizing up-conversion. The fiber-laser device 51B comprises an excitation light source 11B, a first optical fiber 14B, a second optical fiber 17B, and mirrors 31B and 32B for realizing up-conversion.

To obtain R, G, and B output lights respectively, these fiber-laser devices 51R, 51G, and 51B have their respective settings of the excited light wavelength, the mirrors' reflection coefficient, and the rare earth added to the up-conversion fiber and the concentration thereof. The R, G, and B lights emitted from fiber-laser devices 51R, 51G, and 51B are injected to their corresponding space modulation elements 52R, 52G, and 52B such as an LCD panel to then undergo space modulation. Thus space-modulated R, G, and B lights are synthesized by synthesizing means 53 such as a dichloic prism to then be made incident upon a projection lens 54. These incident lights are displayed in an image by the projection lens 54 on a screen 55.

This embodiment uses three space modulation elements corresponding to the R, G, and B colors respectively.

FIG. 6 is a schematic configuration diagram for showing the display using the fiber-laser device according to another embodiment of the present invention. In this embodiment, the R, G, and B lights emitted from the fiber-laser devices 51R, 51G, and 51B respectively are collected into a white light as viewed macroscopically (as a whole). The optical fibers for the light R, G and B are collected and form white-light generating means. Thus formed white light is made incident upon an LCD panel 61 provided with a color filter to then be displayed in an image by the projection lens 54 on the screen 55.

As thus mentioned, by the present invention, an endothermic up-conversion fiber and an excitation light source are disposed distant from each other, thus enabling the reduction of the shift of the optical axis owing to temperature fluctuations at the spliced portion. Furthermore, a mirror of the resonator is not evaporated on the elongated up-conversion fiber, thus enabling the facilitation of the manufacturing process.

As thus mentioned, in a fiber-laser device according to the above-mentioned embodiments, the endothermic up-conversion fiber and the excitation light source are disposed distant from each other, thus enabling the reduction of the shift of the optical axis owing to temperature fluctuations at the spliced portion. In addition, the mirror of the resonator is not evaporated on the elongated up-conversion fiber, thus enabling the facilitation of the manufacturing process.

Figure 7A:
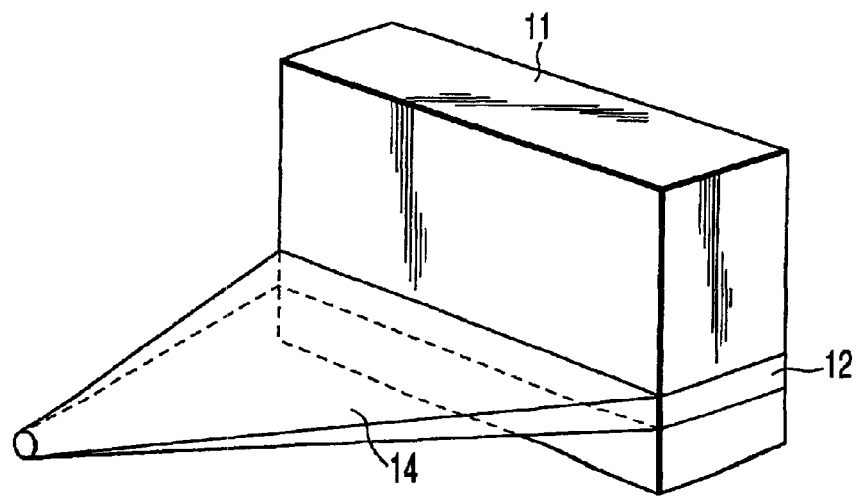
FIGS. 7A to 7D are illustrations for showing an example of splicing between a semiconductor laser and a first optical fiber.
Figure 7B:
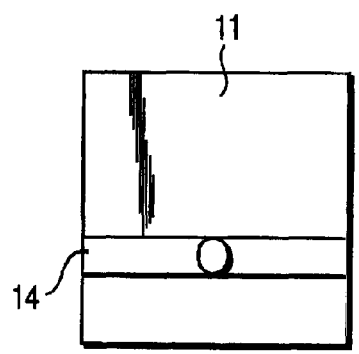
Figure 7C:
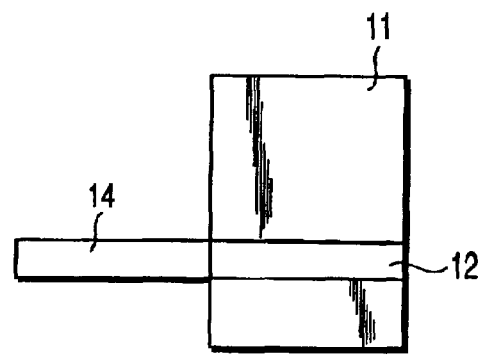
Figure 7D:
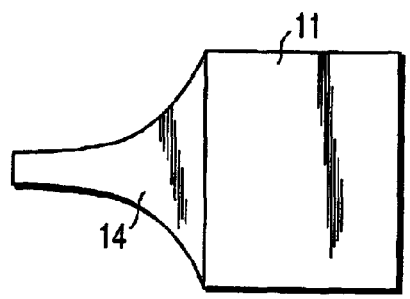

FIGS. 7A to 7D are illustrations for showing an example of splicing the semiconductor laser 11 and the first optical fiber 14 with each other. To enhance the output power of the semiconductor laser 11, it is necessary to widen the active layer for emitting a laser light. To this end, the optical fiber 14 has such a shape that one end thereof is flatted to match a large width of the active layer of the semiconductor laser 11 and the other end thereof is circular to match the end of the second optical fiber 17. Of course, in this case also, a connector may be used for splicing the optical fiber 14 and the semiconductor laser 11 with each other. FIG. 7B is an elevation view, FIG. 7C is a side view, and FIG. D is a plan view.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A fiber laser device comprising:

an excitation light source;

a first optical fiber having a first end to which output light from the excitation light source is input, and a second end from which the output light is output;

a first mirror provided on the second end of the first optical fiber, which allows light incident from the first optical fiber to pass therethrough from a first side of the first mirror to a second side of the first mirror and which reflects light having a first predetermined wavelength incident on the second side;

a second optical fiber having a core to which a laser activation material is added, and a first end to which light which passed through the first mirror and light reflected by the first mirror are input, the first end being in contact with the first mirror;

a third optical fiber having a first end and a second end; and a second mirror provided on the first end of the third optical fiber, which reflects light having the first predetermined wavelength incident from the second optical fiber and which allows light having a second predetermined wavelength incident from the second optical fiber to pass therethrough, wherein the second optical fiber is longer than the first and third optical fibers, and the first and second ends of the second optical fiber are connected, respectively, to the first and second mirrors, and wherein only the second optical fiber has a core to which a laser activation material is added.

2. A fiber-laser device according to claim 1, wherein the first and second mirrors include a dielectric thin film.

3. The fiber-laser device according to claim 1, wherein the fiber-laser device is used in a display.

* * * * *